Sept. 17, 1968         G. DE COYE DE CASTELET         3,401,976
SUN VISORS FOR VEHICLES
Filed July 1, 1966                                      2 Sheets-Sheet 1

Sept. 17, 1968    G. DE COYE DE CASTELET    3,401,976
SUN VISORS FOR VEHICLES
Filed July 1, 1966    2 Sheets-Sheet 2

United States Patent Office 3,401,976
Patented Sept. 17, 1968

3,401,976
SUN VISORS FOR VEHICLES
Gaetan de Coye de Castelet, Billancourt, France, assignor to Regie Nationale des Usines Renault, Billancourt, Hauts-de-Seine, France
Filed July 1, 1966, Ser. No. 562,184
Claims priority, application France, July 21, 1965, 25,440; June 2, 1966, 63,879
5 Claims. (Cl. 296—97)

ABSTRACT OF THE DISCLOSURE

A shock absorbing sun visor for motor vehicles including an articulation spindle mounted on the vehicle with a plate-like frame member of substantially rigid material. One side of the frame member is pivotally attached to the spindle and the opposite side is constructed so as to be readily detachable by application of a small force to thereby form a shock absorber for passengers.

---

The present invention relates to a sun visor for vehicles and concerns an anti-glare screen with protection against shocks. A sun visor can be particularly dangerous, since it is mounted at the point where the heads of passengers in a vehicle generally strike in case of accidents. A sun visor, in addition to its function of protection against the sun, must be a fitting which can contribute to the safety of passengers in a vehicle and can play the part of a shock-absorber.

The invention has for its object an opaque sun visor constituted by a frame of variable stiffness which is covered with a flexible material such as plastic or elastic sponge material suitable for absorbing shocks under good conditions, having an attractive appearance, passing into a screen housing through which passes the articulation spindle of the sun visor so as to form a kind of brake lining for maintaining the sun visor in the position desired by the user.

In the accompanying drawings:

FIG. 6 is a view in longitudinal section of this form of embodiment, taken along the line VI—VI of FIG. 7;

FIG. 7 is a view in transverse section taken along the line VII—VII of FIG. 6;

FIG. 8 shows a plan view of the sun visor frame of FIGS. 6 and 7;

FIG. 9 is an end view of the same frame in the direction of the arrow IX of FIG. 8;

FIG. 10 shows a section along the line X—X of FIG. 11 of the perforated element of the sun visor of FIGS. 6 and 7;

FIG. 11 is a view in cross-section along the line XI—XI of FIG. 10;

FIG. 12 shows to a larger scale the part XII enclosed in chain-dotted lines in FIG. 6;

FIG. 13 is a view in section taken along the line XIII—XIII of FIG. 12.

Figure 1:
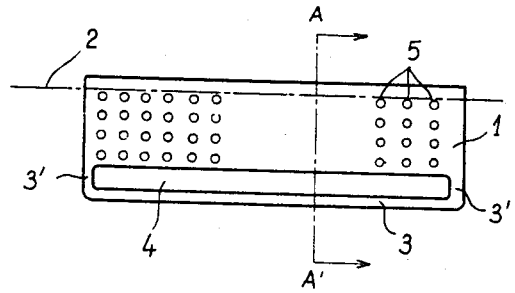
FIGS. 1, 2 and 3 show by way of example frames of sun visors in accordance with the invention.
Figure 2:
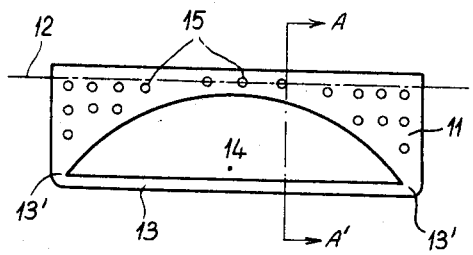
Figure 3:
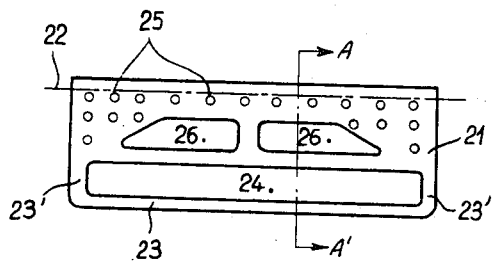
Figure 4:
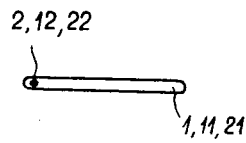
FIGS. 4 and 5 are examples showing possible forms of the section along A–A' of one or another of the three frames shown in FIGS. 1 to 3.
Figure 5:

Referring now to the drawings, it can be seen that the frames 1, 11 or 21 respectively of FIGS. 1, 2 and 3 may be of metal, cardboard or molded plastic material, or of stamped-out plastic material.

The pivotal axes of the sun visor are indicated at 2, 12 and 22.

The lower edges 3, 13 and 23 of these sun visors, which are the first to be encountered by the passengers in case of shocks, are only connected to the remainder of the sun visor by small sections, such as 3', 13' and 23', which sections are intended to break when the passengers come into contact with the sun visor. This would result in a deadening of the impact, followed by rotation of the whole sun visor.

The small sections 3', 13' and 23' are obtained by means of cut-out portions such as 4, 14 and 24.

It will of course be understood that the constructions of the frames of FIGS. 1, 2 and 3 have only been given by way of examples. The essential characteristic of the frame forming the object of the invention resides in that it comprises a lower portion or portion opposite to the articulation axis, connected to the body by coupling portions adapted to be easily broken in case of shocks.

According to another characteristic feature of the invention, the frames 1, 11 and 21 are intended to be embedded in a sponge of plastic or elastic material forming directly their molded skin with the desired grain. Polyurethanes are particularly suitable for forming this sponge.

The perforations 5, 15, 25 of the frames of FIGS. 1, 2 and 3, together with the cut-out portions 26 of the frame of FIG. 3, have the purpose of permitting the development of the sponge and the fixing of the sponge to the frame. Any other kind of perforations or recesses in the frame may also be provided.

In the construction shown in FIGS. 6 to 13, an alternative form of embodiment is illustrated: a sun-visor screen formed of plastic sponge material enclosing a frame of cardboard or the like, the screen being adapted to serve as a shock-absorber and having a housing for the articulation spindle. The sponge material projecting into the interior of the housing so as to form a kind of brake lining.

According to a preferred form of construction, the housing for the articulation spindle is formed by means of an element comprising on the one hand at least one flat portion for its fixing by the frame, and on the other hand, a perforated portion forming a free passage of width greater than the diameter of the spindle, so that during the development of the sponge, this latter passes through the perforations and comes into contact with a calibration spindle.

A sun-visor screen of this kind, when it is mounted on its articulation spindle, lightly grips the said spindle at the point of the sheath formed by the sponge which has passed through the perforations, which enables it to remain in any predetermined position.

Figure 7:
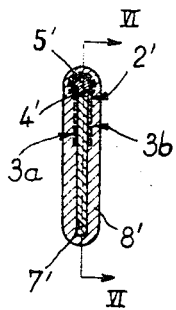
FIGS. 6 to 13 show one form of construction of the screen, relating more particularly to the braking of the pivotal movement of the screen on the articulation spindle.
Figure 6:
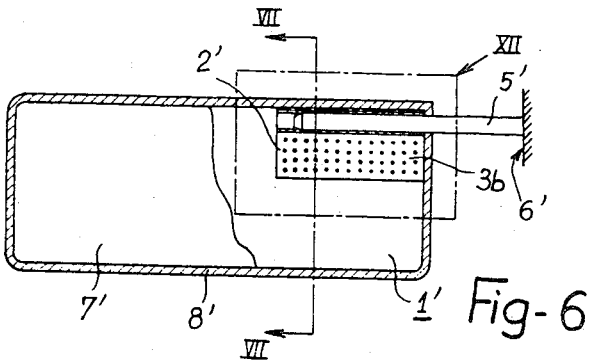
Figure 9:
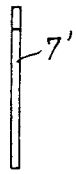
Figure 8:
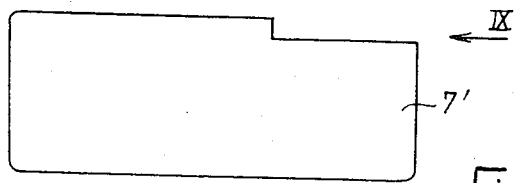
Figure 11:
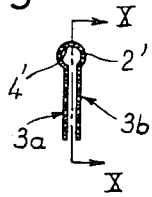
Figure 10:
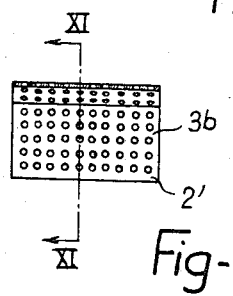
Figure 13:
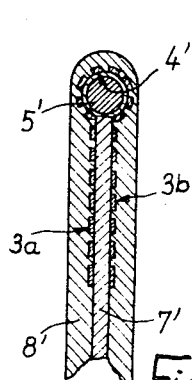
Figure 12:
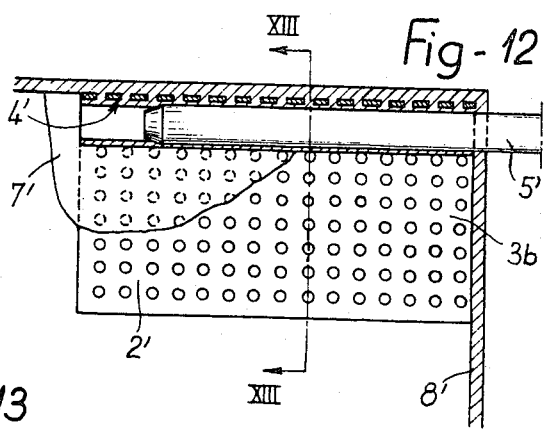

Referring to FIGS. 6 and 7 of the drawing, it is seen that the sun-visor screen 1 comprises a perforated element 2' constituted in this example by a small perforated plate of sheet steel. It is provided with two flat portions 3a and 3b and a cylindrical eye 4' (FIGS. 7 and 13), the diameter of this eye being greater than that of a spindle 5' serving as a pivot for the screen 1, and fixed to the body 6' of a vehicle (FIG. 6).

Between the flat portions 3a and 3b is inserted and gripped a frame 7' of cardboard, of a sheet of ligneous particles or fibers, or of any other sheet material having a suitable stiffness. The element 2' and the frame 7' are embedded in a coating 8' of plastic sponge material, covering particularly the inner wall of the cylindrical eye 4', and forming a sheath having a diameter less than that of the spindle 5'.

In order to obtain the coating 8', the whole assembly of the frame 7' and element 2' is arranged inside a mold (not shown), and a pilot or calibration spindle (not shown), similar to the spindle 5', but having a smaller diameter, is passed into the cylindrical eye 4'. When a sponge of plastic material is poured into the mold, this material passes through the perforations in the element 2' and comes into contact with the surface of the calibration spindle, thus forming, after hardening, a sheath having a diameter less than that of the spindle 5'.

When the sun visor is mounted on the spindle 5', this sheath lightly grips the spindle, braking any possible movements of rotation of the sun visor and permitting it to retain a predetermined position. The forces resulting from the braking of the spindle 5' are transmitted to the frame 7' through the intermediary of the element 2' which distributes them over the frame.

A sun visor of this kind is therefore at the same time effective and simple, comprising in fact only three elements: the frame 7', the perforated element 2' and the covering 8' of plastic sponge material.

What is claimed is:

1. A shock absorbing sun visor for vehicles comprising an articulation spindle mounted on said vehicle, a panel-frame member of substantially rigid material mounted for pivotal movement about said spindle, and a flexible material covering said frame member, the side of said frame member opposite the pivotal axis including a frangible portion which is readily detached by a force applied thereto thus serving as a shock absorber for said force.

2. A shock absorbing sun visor in accordance with claim 1 further comprising resilient sponge material enveloping said frame member with the outer surface thereof forming said flexible covering.

3. A shock absorbing sun visor in accordance with claim 2 further comprising a plurality of perforations and cut outs selectively provided in said panel-frame member, said perforations and cut outs permitting the development of said resilient sponge material and providing an anchorage therefor.

4. A shock absorbing sun visor in accordance with claim 2 in which a housing for said articulation spindle is formed in said frame member, a plurality of perforations formed in said housing, said resilient sponge material overflowing through said orifices into the interior of said housing to frictionally engage said spindle thereby restricting the pivotal movement of said frame member.

5. A shock absorbing sun visor in accordance with claim 4 in which said housing comprises at least one flat portion for attachment to said frame member and an integral perforated portion forming a substantially closed cylinder having a diameter greater than that of said spindle, said resilient sponge material passing through said perforations to frictionally engage said spindle.

References Cited

UNITED STATES PATENTS

| 2,506,689 | 5/1950 | Simpson et al. |
| 2,679,467 | 5/1954 | Sherts. |

FOREIGN PATENTS

| 854,938 | 11/1960 | Great Britain. |

BENJAMIN HERSH, *Primary Examiner.*

J. A. PEKAR, *Assistant Examiner.*